R. DUBOIS.
TAIL VALVE APPARATUS FOR COMPRESSED AIR BRAKES.
APPLICATION FILED FEB. 24, 1920.

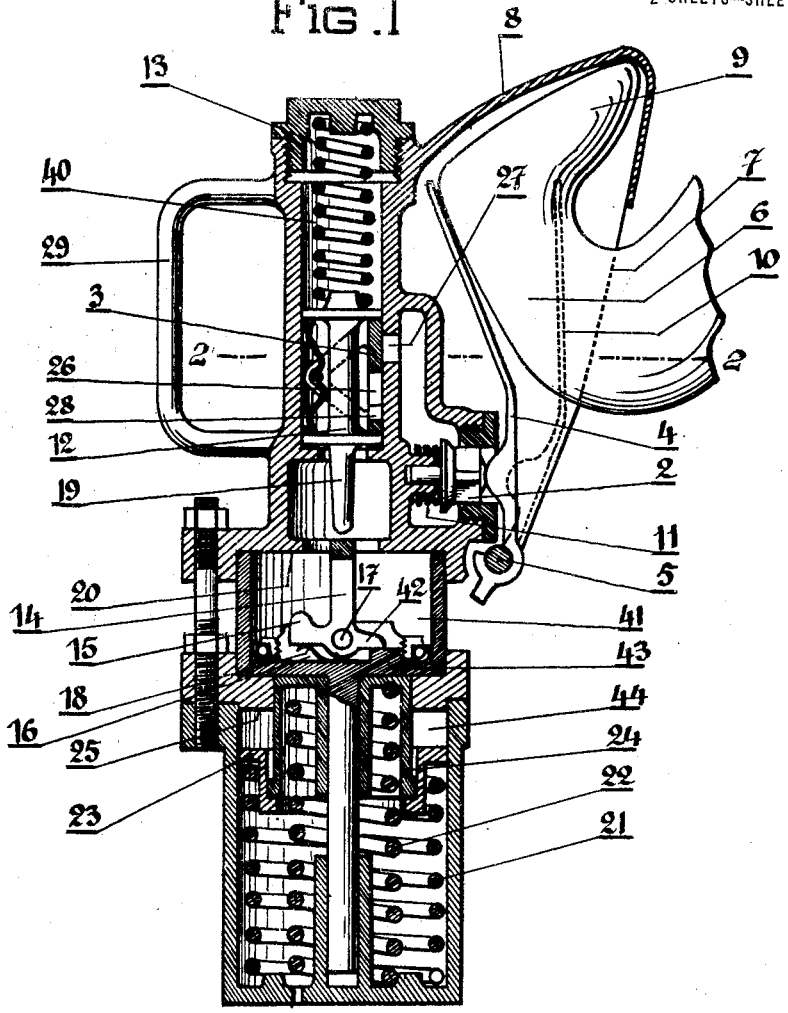
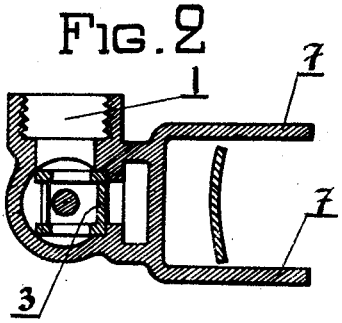
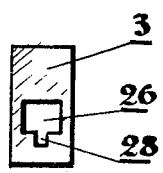

1,404,102.

Patented Jan. 17, 1922.

Inventor
R. Dubois.
By H. R. Kerslake
Atty

UNITED STATES PATENT OFFICE.

ROBERT DUBOIS, OF PARIS, FRANCE.

TAIL-VALVE APPARATUS FOR COMPRESSED-AIR BRAKES.

1,404,102. Specification of Letters Patent. Patented Jan. 17, 1922.

Application filed February 24, 1920. Serial No. 360,727.

(GRANTED UNDER THE PROVISIONS OF THE ACT OF MARCH 3, 1921, 41 STAT. L., 1313.)

*To all whom it may concern:*

Be it known that I, ROBERT DUBOIS, a citizen of the French Republic, residing at No. 6 Rue Gounod, Paris, France, have invented certain new and useful Improvements in Tail-Valve Apparatus for Compressed-Air Brakes, (for which I have filed application in France, May 28, 1914, Patent No. 472,-766,) of which the following is a specification.

Valves for compressed air brakes have already been constructed which assure an immediate locking of the brakes in case of the accidental fall of pressure in the main or auxiliary compressed air reservoirs. In these devices which comprise a valve subject on one of its faces to the action of compressed air, the other face to the action of a spring, the movement of the valve under the action of the spring when the pressure of the compressed air falls below a certain value causes the opening of a discharge orifice, the result of which is a sudden drop in pressure, the continuation of the movement of the valve then being capable of closing the discharge orifice when the pressure has fallen below another value. In the present invention which permits accessorily of attaining the same results as devices of this type and under better conditions, it is proposed that the driver, by testing the brakes, assure himself that there is no break in the continuity of the conduit over the entire length of the train.

For this purpose three conditions are necessary.

1. That the valve be fitted on the general passage itself and not on the reservoir. In fact, in this latter case, the fall of pressure produced in the conduit causing the triple valve to operate will isolate the reservoir which will divert a portion of its air into the brake cylinder. Hence, starting from the moment of this fall of pressure in the reservoir there will be no certainty as to the fall of pressure in the conduit.

2. That the operation of the valve produce in the general conduit a drop in pressure which is exact between two limits. To obtain this result use is not made of devices as crude as those mentioned above. In these valves, in fact, the discharge orifice opened wide for the discharge of the compressed air, is suddenly and completely closed as soon as the local pressure in its vicinity is below a determined limit. In the valve forming the subject of the present invention, on the contrary, the discharge port is closed progressively, the pressure thus having time to be equalized over the entire conduit and the complete closure being effected only when equilibrium is established.

3. That the valve be fitted at the rear of the train so as to indicate the continuity of the conduit over its entire length. For this purpose the construction of the valve which is the subject of the invention is such that it can be applied only to the end of the train.

A constructional form of this invention is illustrated by way of example in the accompanying drawings in which:

Fig. 1 is a longitudinal section of the improved valve apparatus when fitted in place on the rear coupling hook of the tail vehicle of the train.

Fig. 2 is a section on the line 2—2 of Fig. 1; and

Fig. 3 is an underside view of the air-discharge slide.

Figure 4:
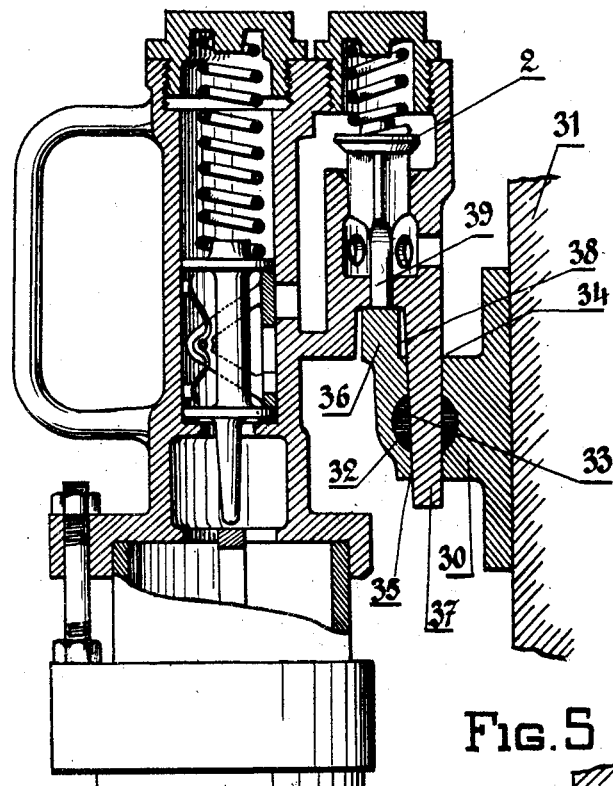
Fig. 4 is a partial longitudinal section of a modified form of the means of mounting the valve apparatus.

The improved valve apparatus is in direct communication with the compressed air train pipe by way of the union 1 (Fig. 2) provided with a coupling not shown.

The discharge outlet of the air is controlled by a valve 2 and the slide 3 (this latter is shown separately in Fig. 3).

The valve 2 is actuated by a lever 4 fulcrumed on a pin 5 inside a box 6 formed by two sides 7 and a top 8. This box 6 serves for the suspension of the apparatus and is placed upon the back coupling hook 9 of the train.

So long as the improved apparatus is not mounted on the coupling hook, the lever 4 is pressed back by the spring 11 of the valve 2, and it occupies the position indicated in dotted lines at 10 in Fig. 1; the valve 2 is closed. On the contrary, when the improved apparatus is mounted on a coupling hook the lever 4 presses back the valve and the latter remains off its seat.

The slide 3 is capable of sliding vertically in a chamber 40; its motion is produced by means of a guide member 12, by the counter-spring 13 on the one hand, and by an escapement finger 14 on the other hand.

This finger 14 is provided with a small operating arm 15 and is carried by a piston 16 adapted to move in a cylindrical chamber 41. The finger 14 which is capable of turning on the pivot pin 17, is constantly held in the position shown in Fig. 1, by the spring 18 which presses against the arm 15, and by its heel 42 which bears upon a projection 43 of the piston 16. In this position the finger 14 acts upon the tail 19 of the guide member 12. The escapement comes into action when the arm 15 strikes against the top 20 of the chamber 41.

The air-tight piston 16 is exposed on its upper face to the air pressure in the train pipe, and on its lower face to the action of two springs 21 and 22 through the medium of sliding sleeves 23 and 24. These springs with their sleeves are arranged in a box 44 fitted with a lid 25.

When the piston 16 is at the bottom of its stroke, it is subjected to the action of the two springs. When it has moved through a certain portion of its stroke, the sleeve 23 strikes against the lid 25, and the piston is acted upon at its lower face only by the spring 22.

The slide 3 has an aperture 26 with an extension in the form of a notch 28 (Fig. 3). The side of chamber 40 is likewise formed with an aperture 27 of the same dimensions as the aperture 26. These two apertures are adapted to come, one opposite the other, in a given position of the slide 3.

29 is a handle for use in transporting the improved apparatus.

The hereinbefore described mounting of the tail valve apparatus upon the coupling hook, is extremely simple, but it may have drawbacks, and especially in the case of automatic couplings, it may render the apparatus liable to be damaged if a collision should occur at the tail of the train.

Figure 5:
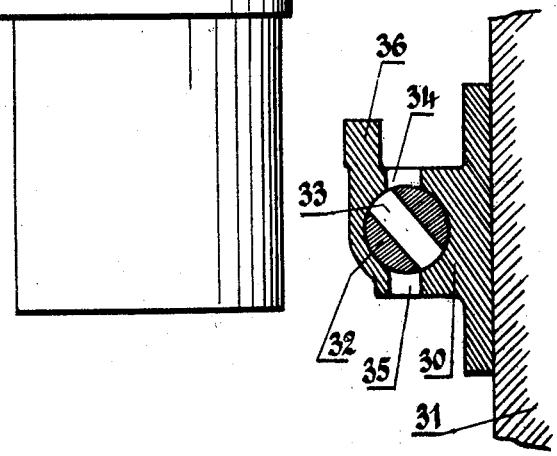
Fig. 5 is a section through the support shown in Fig. 4.

In the modified form illustrated in Figs. 4 and 5, the valve apparatus is mounted on a support 30 which is fixed to the vehicle 31 and which comprises essentially a cock plug 32 pierced throughout with a hole 33. This plug is adapted to rotate on its axis or to move longitudinally. On the other hand, the support comprises above and below the plug 32 two holes 34 and 35, situated exactly opposite each other and having the same cross section as the hole 33. In a determined position of the plug 32 they can coincide with the intermediate hole 33. In Fig. 4, the holes 33, 34 and 35 are shown in line with one another, whereas the contrary is shown in Fig. 5.

The support 30 has moreover on the side farthest from the vehicle, a projection 36 which, when the tail valve apparatus is mounted in position (Fig. 4), is adapted to meet and raise the stem 39 for actuating the test valve 2.

The tail valve apparatus is provided with a shank 37 which is adapted to enter the holes 33, 34 and 35 when all these holes coincide together, and it is also provided with a cavity 38 into which the projection 36 can enter.

The plug 32 is operatively connected by a suitable device to the automatic coupling in such a manner that the hole 33 is situated opposite the holes 34 and 35 only when the actuating member of the coupling is in a position corresponding to "open" (uncoupled) coupling. The coupling device may be formed, for example, by a lever 40 to which the key 32 is rigidly attached, this lever 40 being pivoted to another lever which is connected to the draft device. Consequently the test valve can be lifted (opened) only when the coupling is itself "open" and the tail valve apparatus can operate only when it is mounted on the last vehicle of the train.

It is to be understood that the arrangement of a plug pierced with a hole and operatively connected to the coupling apparatus is given solely by way of example; it may be replaced by any other arrangement wherein any member, in operative connection with the coupling, will be able, when coupling is possible, to enter the structure of the tail valve apparatus which is assumed to be mounted on its support and will be situated outside the said structure when coupling is impossible.

To facilitate the description of the working of the improved apparatus it is assumed that the normal working pressure in the train pipe is 5 kg., and that the tail valve is so regulated as to cause a discharge of the air between the limits of 3 kg. and 1 kg. The margin between 5 kg. and 3 kg. is sufficient to allow of applying the brakes normally without causing the tail valve to come into action.

So long as the pressure in the train pipe is higher than 3 kg., the various parts will occupy the positions shown in Figs. 1 to 4. Valve 2 is open owing to the improved apparatus being mounted, and the aperture 27 is closed by the slide 3 because the air pressure is capable of counterbalancing the action of springs 21 and 22.

When the pressure in the train pipe falls to 3 kg., the piston is raised by the two springs 21 and 22; the aperture 26 in the slide comes opposite the aperture 27 of the chamber 40, and the air is discharged into the atmosphere. The sleeve 23 now bears against the cover 25.

The slide 3 remains in this position until the pressure has fallen to about 1 kg., so that it no longer counterbalances completely the action of the spring 22 which alone pushes the piston upwards.

From this moment the piston continues to move under the action of the spring 22; the discharge aperture 27 is partly closed; and at the same time the arm 15 of the finger 14 strikes against the wall 20; the finger rocks and releases the tail 19; the slide is no longer acted upon except by the spring 13 and it returns into its original position shown in Fig. 1, and the discharge of the air ceases. The notch 28 formed in the slide is intended to prevent the aperture from being completely closed before the escapement is operating with certainty.

From this moment it is necessary to re-establish in the train pipe a higher pressure than 3 kg. in order that the piston shall resume its original position and the escapement become re-set.

To test the brakes, the driver, after having charged the train pipe with a pressure approximating to the normal pressure, applies the brakes slightly in order to disconnect the pipe of the auxiliary reservoirs, and then he allows the pressure to fall slowly. If there is no break in the train pipe as far as the tail valve, the pressure on rising to 3 kg. will fall suddenly to 1 kg.

When a considerable fall in pressure occurs so as to put the brakes hard on, this fall will be increased by the operation of the tail valve.

In the case of a slow fall in the pressure, the brakes will be put hard on when the pressure reaches the limit prescribed for the operation of the tail valve.

What I claim is:—

1. In a tail valve apparatus for compressed air brakes, in combination, a piston subjected on one face to the air pressure, two springs of different strength acting on the other face of the piston, an air discharge valve, an air outlet, a slide adapted to move by said air outlet and provided with an aperture and with a notch leading from the aperture and forming an extension thereof, and an escapement mechanism connected to said piston for causing the movements of said slide.

2. In a tail valve apparatus for compressed air brakes, in combination, a piston subjected on one face to the air pressure, two springs of different strength acting on the other face of the piston, an air discharge valve, an air outlet orifice, a slide adapted to move past said orifice and provided with an aperture and with a notch leading from the aperture and forming an extension thereof, an escapement mechanism connected to the piston for causing the movements of slide, a member attached to the vehicle for the mounting of the valve apparatus, and a coupling hook in operative relation with said member.

3. In a tail valve apparatus for compressed air brakes, in combination, a piston subjected on one face to the air pressure, two springs of different strength acting on the other face of the piston, an air discharge valve, an air outlet orifice, a slide adapted to move past said orifice and provided with an aperture and with a notch leading from the aperture and forming an extension thereof, an escapement mechanism connected to said piston for causing the movements of said slide, a member attached to the vehicle for the mounting of the valve apparatus, a coupling hook in operative relation with said member, and means controlled by said member for acting upon the air discharging valve whereby said valve is open when the valve apparatus is mounted in position.

In testimony whereof I have signed my name to this specification.

ROBERT DUBOIS.